US012250101B1

(12) United States Patent
Zhang

(10) Patent No.: US 12,250,101 B1
(45) Date of Patent: Mar. 11, 2025

(54) COHERENT OPTICAL MODULE FOR SHORT REACH COMMUNICATIONS

(71) Applicant: Cisco Technology, Inc., San Jose, CA (US)

(72) Inventor: Hongbin Zhang, Holmdel, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 233 days.

(21) Appl. No.: 18/155,886

(22) Filed: Jan. 18, 2023

Related U.S. Application Data

(60) Provisional application No. 63/301,040, filed on Jan. 19, 2022, provisional application No. 63/300,597, filed on Jan. 18, 2022.

(51) Int. Cl.
*H04B 10/00* (2013.01)
*H04B 10/40* (2013.01)
*H04L 25/03* (2006.01)

(52) U.S. Cl.
CPC ....... *H04L 25/03159* (2013.01); *H04B 10/40* (2013.01); *H04L 25/03178* (2013.01)

(58) Field of Classification Search
CPC ........ H04L 25/03159; H04L 25/03178; H04B 10/40
See application file for complete search history.

(56) References Cited

U.S. PATENT DOCUMENTS

| 9,178,625 | B1* | 11/2015 | Hueda | H04B 10/6165 |
| 2002/0122503 | A1* | 9/2002 | Agazzi | H04L 25/03159 |
| | | | | 375/316 |
| 2006/0245765 | A1* | 11/2006 | Elahmadi | H04B 10/2513 |
| | | | | 398/189 |
| 2008/0031633 | A1* | 2/2008 | Hoshida | H04B 10/6971 |
| | | | | 398/149 |
| 2011/0150477 | A1* | 6/2011 | Winzer | H04J 14/06 |
| | | | | 398/79 |
| 2011/0150503 | A1* | 6/2011 | Winzer | H04B 10/613 |
| | | | | 398/202 |
| 2011/0243561 | A1* | 10/2011 | Li | H04L 25/03019 |
| | | | | 398/202 |
| 2013/0108276 | A1* | 5/2013 | Kikuchi | H04B 10/677 |
| | | | | 398/210 |
| 2013/0308960 | A1* | 11/2013 | Horikoshi | H03H 21/0012 |
| | | | | 398/209 |
| 2014/0199076 | A1* | 7/2014 | Yu | H04B 10/6163 |
| | | | | 398/81 |

(Continued)

*Primary Examiner* — Agustin Bello
(74) *Attorney, Agent, or Firm* — K&L GATES LLP

(57) ABSTRACT

Disclosed is a coherent optical transceiver for optical communication including a transmitter, a receiver, and a PIC. The transmitter includes a DAC and a driver. A modulator in the PIC limits a signal spectrum of an output optical signal within a Nyquist frequency band. The receiver receives an input optical signal from the PIC and converts the input optical signal to an input analog electrical signal. An ADC converts the input analog electrical signal into an input digital electrical signal indicative of the input optical signal at an ADC sampling rate. The DSP includes a linear filter to equalize intersymbol interference, a post filter, and an MLSE to determine symbols corresponding the input optical signal. The driver and the post filter are first order filters with transfer function G(z)=1+az−1, where a is between 0 and 1.

20 Claims, 9 Drawing Sheets

(56) References Cited

U.S. PATENT DOCUMENTS

| | | | |
|---|---|---|---|
| 2015/0381286 A1* | 12/2015 | Xie | H04B 10/612 398/65 |
| 2016/0065313 A1* | 3/2016 | Yu | H04B 10/614 398/208 |
| 2016/0211939 A1* | 7/2016 | Yu | H04B 10/5561 |
| 2017/0180055 A1* | 6/2017 | Yu | H04J 14/06 |
| 2017/0250758 A1* | 8/2017 | Kikuchi | H04B 10/2513 |
| 2017/0338893 A1* | 11/2017 | Cavaliere | H04L 25/03178 |
| 2018/0062885 A1* | 3/2018 | London | H04L 25/0272 |
| 2018/0248582 A1* | 8/2018 | Yasuda | H04J 11/00 |
| 2019/0165926 A1* | 5/2019 | Stojanovic | H04L 7/0075 |
| 2019/0312648 A1* | 10/2019 | Cavaliere | H04B 10/516 |
| 2023/0361881 A1* | 11/2023 | Taniguchi | H04B 10/516 |
| 2024/0146420 A1* | 5/2024 | Nakamura | H04B 10/6165 |

\* cited by examiner

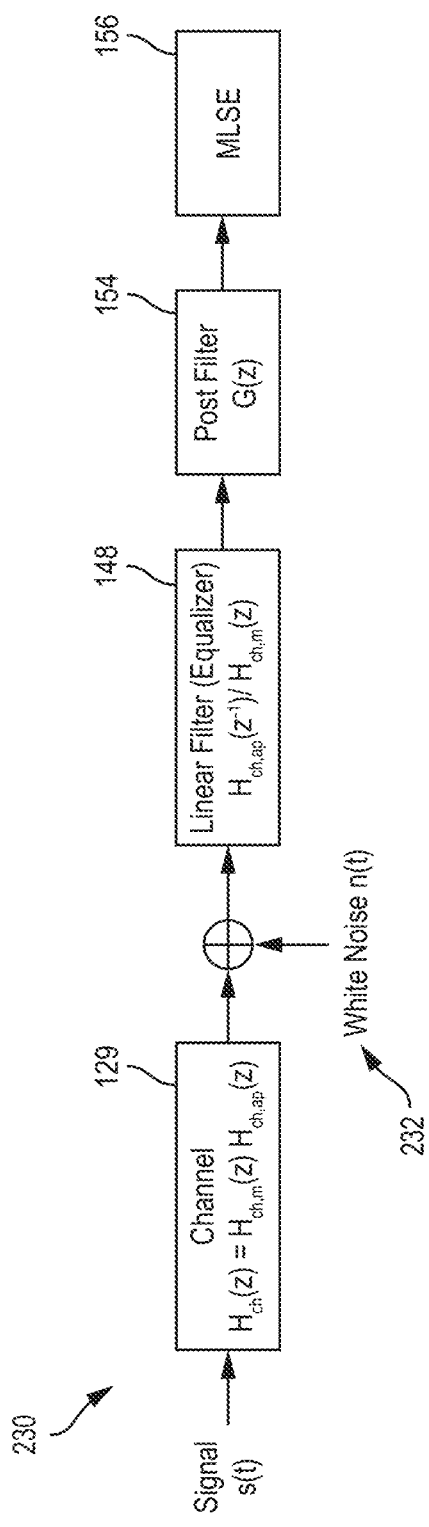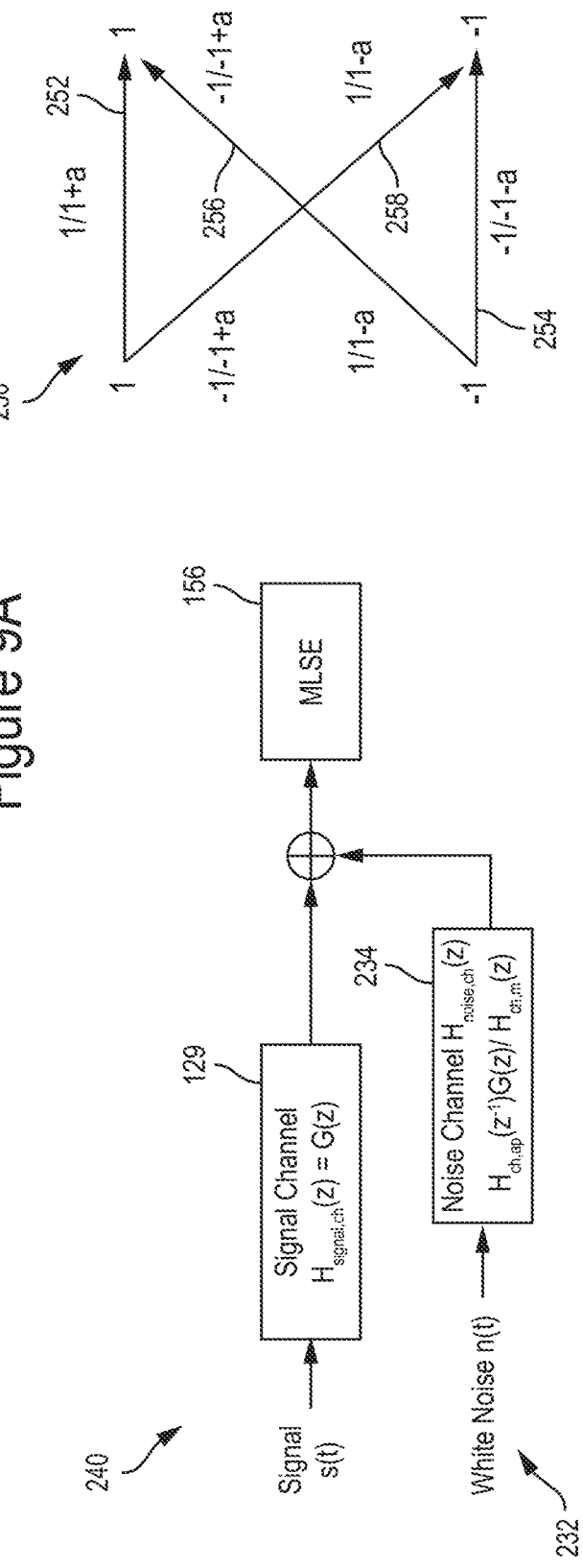
Figure 9A
Figure 9B
Figure 9C

COHERENT OPTICAL MODULE FOR SHORT REACH COMMUNICATIONS

CROSS-REFERENCE TO RELATED APPLICATIONS

This application claims benefit under 35 U.S.C. § 119(e) to U.S. Provisional Application No. 63/300,597, filed Jan. 18, 2022, entitled COHERENT OPTICAL MODULE FOR SHORT REACH COMMUNICATIONS and to U.S. Provisional Application No. 63/301,040, filed Jan. 19, 2022, entitled COHERENT OPTICAL MODULE FOR SHORT REACH COMMUNICATIONS, the disclosure of each of which is hereby incorporated by reference in its entirety.

FIELD

This disclosure relates generally to the field of optical communication systems and methods and more particularly to coherent optical communication systems and methods.

BACKGROUND

Contemporary optical communications and other photonic systems make extensive use of photonic integrated circuits that are advantageously mass-produced in various configurations for various purposes.

SUMMARY

In part, in one aspect, the disclosure relates to a coherent optical transceiver for optical communication. The coherent optical transceiver comprises a transmitter, a receiver, and a photonic integrated circuit (PIC) coupled to the transmitter and receiver. The transmitter comprises a digital-to-analog converter (DAC) and a driver coupled to the DAC. The DAC is configured to convert an output digital electrical signal to an output analog electrical signal at a DAC sampling rate. The PIC is coupled to the driver. The PIC is configured to convert the output analog electrical signal to an output optical signal. The PIC comprises a modulator configured to modulate the output analog electrical signal with a laser beam to generate the output optical signal. The modulator is configured to limit a signal spectrum of the output optical signal within a Nyquist frequency band. The receiver comprises an input circuit, an analog-to-digital converter (ADC), and a digital signal processor (DSP). The input circuit is configured to receive an input optical signal from the PIC and convert the input optical signal to an input analog electrical signal. The ADC is configured to convert the input analog electrical signal into an input digital electrical signal indicative of the input optical signal at an ADC sampling rate. The DSP includes a linear filter, a post filter, and a maximum likelihood sequence estimator (MLSE). The linear filter is configured to equalize intersymbol interference. The post filter is coupled to the linear filter. The driver and the post filter are configured as a first order filter with a transfer function given by $G(z)=1+az^{-1}$, where a is between 0 and 1. The MLSE is configured to determine symbols corresponding the input optical signal.

In another aspect of the coherent optical transceiver, a driver bandwidth of the driver and a modulator bandwidth of the modulator are selected to be less than the Nyquist frequency band.

In another aspect of the coherent optical transceiver, the modulator is characterized by a transfer function selected to be equal to the transfer function of the driver and is given by $H(z)=G(z)=1+az^{-1}$. In yet another respect, the transfer function of the modulator and the transfer function of the driver are configured to reduce modulation dependent loss (MDL) and improves a loss budget for short-distance communications between 500 meters and 2 kilometers.

In another aspect of the coherent optical transceiver, the MLSE is configured to implement a trellis having a number of branches corresponding to $2^{(L+1)}$ where L is a filter of same order as a transfer function $G(z)$ of the post filter.

In another aspect of the coherent optical transceiver, the DAC sampling rate is one sample per symbol (1sps) and the ADC sampling rate is one sample per symbol (1sps).

In another aspect of the coherent optical transceiver, the DSP comprises a digital frequency compensator coupled to an input of the linear filter. In yet another respect, the digital frequency compensator is located after the ADC and before data processing circuits of the DSP. spectrum is within the Nyquist frequency band. aliasing due to frequency offset has no penalty. The digital frequency compensator is configured to compensate for frequency offset based on a received spectrum of the input analog electrical signal. There is no penalty for aliasing due to the frequency offset when a transmit spectrum of a corresponding transmitted signal is within the Nyquist frequency band.

In another aspect of the coherent optical transceiver, the DSP comprises a timing error corrector coupled to an output of the linear filter, wherein the timing error corrector is configured to estimate timing errors based on the ADC sampling rate of one sample per symbol (1sps) and a resampler coupled to the output of the linear filter and coupled to the output of the timing error corrector. The resampler is configured to resample a waveform digitally. In yet another respect, a signal spectrum of the resampler is within the Nyquist frequency band.

In part, in one aspect, the disclosure relates to a transmitter of a coherent optical transceiver for optical communication. The transmitter comprises a digital-to-analog converter (DAC), a driver coupled to the DAC, and a photonic integrated circuit (PIC) coupled to the driver. The DAC is configured to convert an output digital electrical signal to an output analog electrical signal at a DAC sampling rate. The driver transfer function of the driver is given by $H(z)=G(z)=1+az-1$, where a is between 0 and 1, and wherein $G(z)$ is a transfer function of a post filter in a receiver of the coherent optical transceiver. The PIC is configured to convert the output analog electrical signal to an output optical signal. The PIC comprises a modulator configured to modulate the output analog electrical signal with a laser beam to generate the output optical signal. The modulator is configured to limit a signal spectrum of the output optical signal within a Nyquist frequency band. The Nyquist frequency band is half the DAC sampling rate.

In another aspect of the transmitter, a driver bandwidth of the driver and a modulator bandwidth of the modulator are selected to be less than the Nyquist frequency band.

In another respect of the transmitter, a transfer function of the modulator is selected to be equal to the transfer function of the driver and is given by $H(z)=G(z)=1+az-1$.

In another aspect of the transmitter, wherein the DAC sampling rate is one sample per symbol (1sps).

In part, in one aspect, the disclosure relates to a receiver of a coherent optical transceiver for optical communication. The receiver comprises an input circuit, an analog-to-digital converter (ADC) coupled to the input circuit, and a digital signal processor (DSP) coupled to the DAC. The input circuit is configured to receive an input optical signal from a photonic integrated circuit (PIC) and convert the input optical signal to an input analog electrical signal. The ADC is configured to convert the input analog electrical signal into an input digital electrical signal indicative of the input optical signal at an ADC sampling rate. The DSP comprises a linear filter configured to equalize intersymbol interference, a post filter coupled to the linear filter, and a maximum likelihood sequence estimator (MLSE) coupled to the post filter. The post filter is configured as a first order filter with a transfer function given by $G(z)=1+az-1$, where a is between 0 and 1. The MLSE is to determine symbols corresponding the input optical signal.

In another aspect of the receiver, the ADC sampling rate is one sample per symbol (1sps).

In another aspect of the receiver, the DSP comprises a digital frequency compensator coupled to an input of the linear filter. In yet another aspect, the digital frequency compensator is located after the ADC and before data processing circuits of the DSP. The digital frequency compensator is configured to compensate for frequency offset based on a received spectrum of the input analog electrical signal. There is no penalty for aliasing due to the frequency offset when a transmit spectrum of a corresponding transmitted signal is within a Nyquist frequency band. In another aspect of the receiver, the DSP comprises a timing error corrector coupled to an output of the linear filter and a resampler coupled to the output of the linear filter and coupled to the output of the timing error corrector. The timing error corrector is configured to estimate timing errors based on data sampled by the ADC at a sampling rate of one sample per symbol (1sps). The resampler coupled to the output of the linear filter and coupled to the output of the timing error corrector, wherein the resampler is configured to resample a waveform digitally. In yet another aspect, a signal spectrum of the resampler is within the Nyquist frequency band.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which:

FIG. 4A is a diagram depicting transmit signal spectrum shown in dashed line and a received signal spectrum of an analog electrical signal before analog-to-digital conversion that has moved outside a first Nyquist frequency zone into a second Nyquist frequency zone due to laser frequency shift (a) according to an exemplary embodiment of the disclosure;

FIG. 4B is a diagram depicting an aliasing signal component of a signal spectrum of a received analog electrical signal that extends into a second Nyquist frequency zone due to aliasing caused by ADC downsampling to one sample per symbol (1sps) according to an exemplary embodiment of the disclosure; and FIG. 4C is a diagram depicting a recovered signal spectrum outside the first Nyquist zone using digital frequency compensation according to an exemplary embodiment of the disclosure.

FIGS. 9A-C illustrate a process of filtering a signal s(t) and noise n(t) before entering the MLSE 156 according to an exemplary embodiment of the disclosure, where:

FIG. 9A illustrates a model of a signal s(t) and noise n(t) in the DSP before entering the MLSE according to an exemplary embodiment of the disclosure;

FIG. 9B illustrates a process for filtering a signal s(t) and the noise n(t) to optimize the performance of the MLSE according to an exemplary embodiment of the disclosure; and FIG. 9C is a diagram of a Trellis segment corresponding to the filtering process of signal s(t) and noise n(t) into the MLSE as shown in FIG. 9B according to an exemplary embodiment of the disclosure.

DETAILED DESCRIPTION

Figure 1:
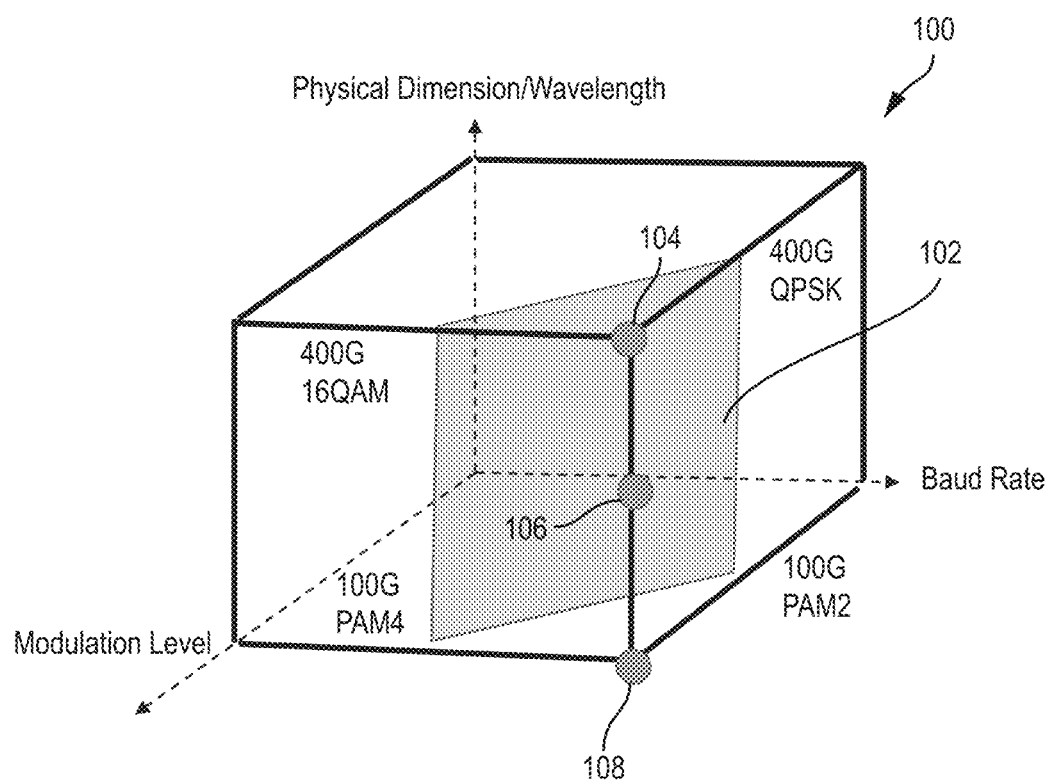
FIG. 1 depicts an example space of several modulation schemes for short distance interconnections according to an exemplary embodiment of the disclosure.

High speed data transfers in short ranges often utilize intensity modulation/direct detection (IM-DD) modulation schemes. An IM-DD modulation scheme is where the intensity of an optical source is modulated by a radio frequency (RF) or mm-wave signal and demodulation is achieved through direct detection of the optical carrier and conversion using a photodetector. IM-DD is most often used for large data transfer volume in data center connections over a distance range of 500 meters to 2 kilometers or intercampus connections for distances up to 10 kilometers. Coherent modulation schemes are more often used large data transfer volume over a distance range of 10 kilometers to a few thousand kilometers. Use of coherent modulation schemes has historically been too costly for data transfer applications over short distances because lasers used in coherent modulation schemes are more expensive than lasers used for IM-DD modulation schemes.

When switch capacity in a data center updates, line capacity has to match, in turn the line capacity must also be updated. IM-DD is less scalable than coherent modulation. One aspect of the present disclosure provides a simplified coherent modulation would reduce the cost of the laser, where one laser is used rather than multiple lasers.

In many applications, short-distance coherent modules may be constrained by strict power consumption requirements. In various aspects, coherent modules for short reach applications according to the present disclosure may be optimized by employing symbol-rate digital signal processing (DSP) techniques in combination with simple maximum likelihood sequence estimator (MLSE) techniques to reduce bandwidth (BW) requirements. In some applications, power consumption of both DSP processing and digital-to-analog (DAC) and analog-to-digital (ADC) modules may be proportional to the sampling rate employed by the DACs/ADCs. In various aspects, the present disclosure provides systems and methods for reducing the sampling rates of both the DAC and ADC to symbol rates in a short-distance coherent digital signal processor (DSP) to reduce overall power consumption.

In some applications, a 4×400G coherent quadrature phase shift keying (QPSK) modulation scheme may have a largest loss budget among various modulation schemes. In certain applications, 4×400G QPSK modulation scheme may operate at 106G baud. In other applications, a 106G baud or similar high baud rate may require large analog BW of components, and may consequently, generate large power consumption.

In many embodiments, Applicants have realized that hyperscale cloud networks may require an increase in bandwidth with dense 100/200/400 GbE links spanning high-radix, ultra-low-latency network topologies. In some embodiments, Applicants have realized that switch capacity may achieve 51.2 terabits/sec in the near future. In certain embodiments, depending on a Radix of data center architecture, 1.6T Ethernet rate is already in discussion. In many embodiments, IM-DD and coherent may be strong candidates for 1.6T Ethernet. For example, 4×4×100G IM-DD, 4×400G coherent.

The specification now turns to the figures, where FIG. 1 depicts an example space of several modulation schemes 100 for short distance interconnects according to an exemplary embodiment of the disclosure. The modulation scheme 100 shows Physical Dimension/Wavelength along a first axis, Baud Rate along a second axis, and Modulation Level along a third axis. Each axis being orthogonal with respect to each other. In this example embodiment, IM-DD modulation schemes are restricted to a bottom layer since there is only one physical dimension (e.g., intensity) per wavelength while coherent modulation schemes are at a top layer using four physical dimensions (in-phase/quadrature×2 polarizations). In this embodiment, the modulation schemes within the shaded intersection plane 102 share similar complexity of hardware, except that the IM-DD modulation schemes require a wavelength multiplexer and de-multiplexer to provide the same number of optical lanes as a coherent modulation scheme. In this example embodiment, 400G amplitude-shift keying 106 (ASK) has two dimensions (in-phase×2 polarizations) per wavelength modulation on the transmit side (TX), and it reduces the number of modulator and drivers by half compared with 4×400G QPSK. Also shown are the 800G 16 quadrature amplitude modulation 104 (QAM) and 200G pulse amplitude modulation 4-level 108 (PAM4). Table 1 shows the configurations and requirements of the various modulation schemes shown in FIG. 1.

TABLE 1

|  | 4×4×100G PAM4 | 4×400G QPSK | 4×400G ASK |
| --- | --- | --- | --- |
| Detection | DD | Coherent | Coherent |
| Lasers | 4 uncooled CWDM lasers | 1 laser with TEC | 1 laser with TEC |
| 4:1 Mux | 1 | 0 | 0 |
| 1:4 DeMux | 1 | 0 | 0 |
| Modulators + drivers | 16 | 16 | 8 |
| DACs | 16 | 16 | 8 |
| TIAs | 16 | 16 | 16 |
| ADCs | 16 | 16 | 16 |
| Baud rate (GBd) | 53 | 106 | 112 |
| Analog 5-dB BW (GHz) | 30 | 35 | 60 |

Table 2 compares the loss budget of the three types of modulation schemes shown in FIG. 1 to achieve a total capacity of 1.6 Tbps (terabits per second). In the particular embodiment shown in FIG. 1, a 4×4×100G4PAM4 module employs four coarse wavelength division multiplexing (CWDM) lasers each with 17 decibel milliwatts (dBm) output power. Both 4×400G QPSK and ASK modules employ one laser with 17 dBm output power, thus the laser power per fiber per wavelength is the same as 10 dBm. In the particular embodiment, 100G PAM4 and 400G QPSK modules do not need additional hard decision-forward error correction (TD-FEC) and their power sensitivity is measured at KP4 FEC threshold (e.g., 2e-4 BER) while 400 ASK has a high bit error rate (BER) floor and needs an additional 7Z RD-FEC and its power sensitivity is measured at 2e-3 BER KP4 is a term used to denote a certain FEC code called the Reed-Solomon RS (544,514) code because this code is standardized for use in 100 Gb/s backplane applications denoted 100 GBASE-KP4 within the Ethernet standard.

TABLE 2

|  | 4×4×100G PAM4 | 4×400G QPSK | 4×400G ASK |
| --- | --- | --- | --- |
| Laser Power per fiber per wavelength (dBm) | 10 | 10 | 10 |
| Modulation Dependent Loss (dB) *400G ASK MDL is same as 400G ZR | 0 | 8 | 11 |
| Mux Loss (dB) | 2 | 0 | 0 |
| DeMux Loss (dB) | 2 | 0 | 0 |
| Quadrature/IQ Loss (dB) | 3 | 3 | 0 |
| TX/RX splitting Loss (dB) | 0 | 1.5 | 1.5 |
| Polarization Splitter Loss (dB) | 0 | 0.5 | 0.5 |
| Modulator Loss (dB) | 3 | 5 | 5 |
| Modulator Coupling Loss (dB) | 5 | 5 | 5 |
| TX Power (dBm) | −3 | −13 | −13 |
| FEC threshold | 2e−4 | 2e−4 | 2e−3 |
| Power sensitivity (dBm) *400G ASK sensitivity is same as 400G ZR | −9 | −21 | −17 |
| Loss Budget (dB) | 4 | 8 | 4 |

In the particular embodiment shown in FIG. 1, a 4×4× 100G PAM4 modulation scheme has the smallest loss budget mainly because of its poor power sensitivity and a 4 dB loss due to the required multiplexer (MUX) and the demultiplexer (DEMIUX) modules. In the particular embodiment shown in FIG. 1, compared to IM-DD, coherent modulation schemes are more tolerant toward optical impairments such as dispersion and message passing interface (MIPI) and achieve higher power sensitivity.

In the particular embodiment shown in FIG. 1, coherent detection requires a narrow linewidth and wavelength stable laser, which increases the cost and power consumption of a transceiver. In this particular embodiment, coherent modulation has a large modulation dependent loss, which reduces the advantage of power sensitivity. In the particular embodiment shown in FIG. 1, the above issues have the smallest impact on 4×400G coherent QPSK modulation schemes. In the particular embodiment shown in FIG. 1, the 400G QPSK modulation scheme has a strong tolerance to laser linewidth and laser frequency offset due to its high baud rate and large Euclidean distance, and it has a small modulation loss.

Figure 2:
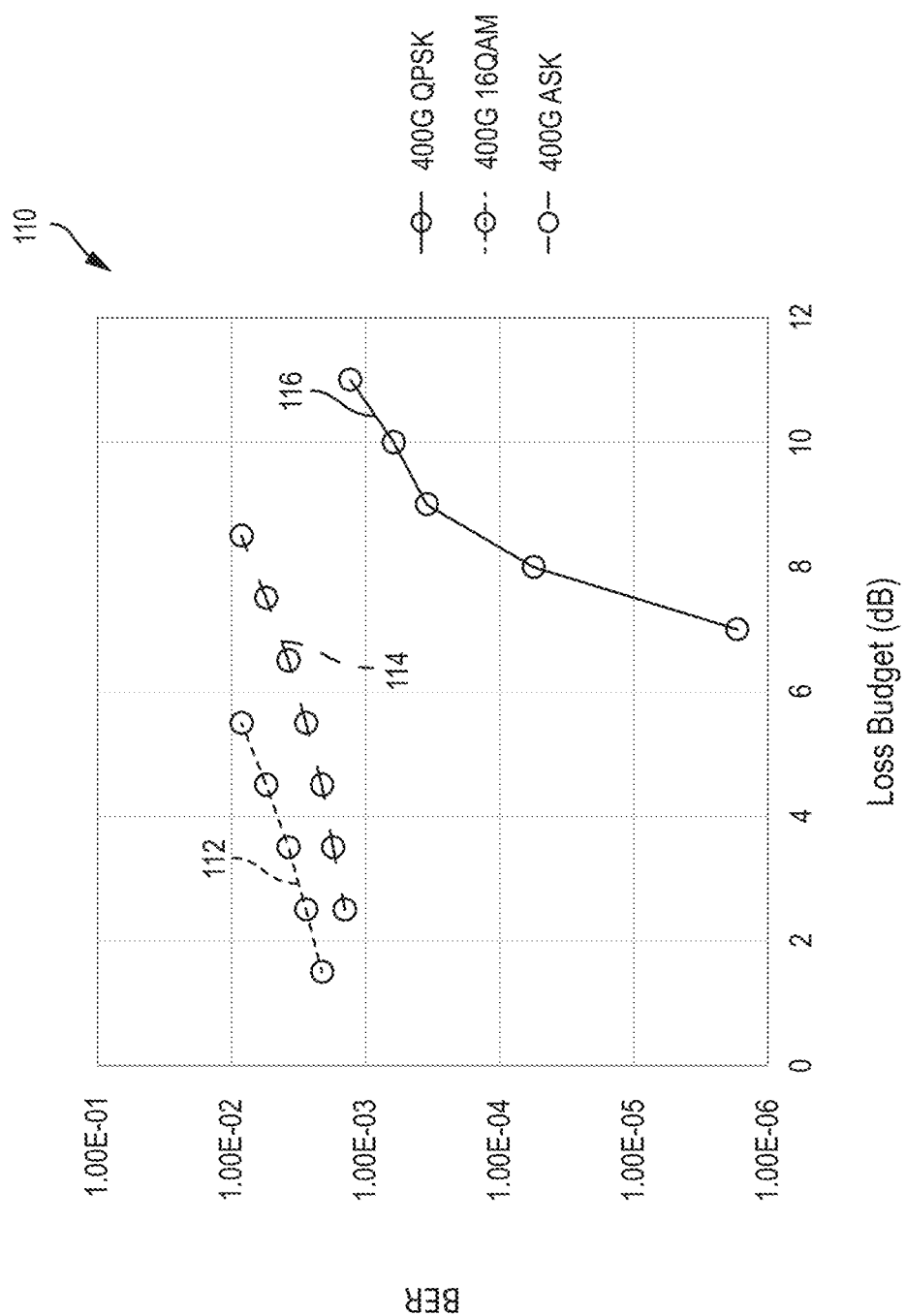
FIG. 2 is a graphical depiction of several plots depicting Bit Error Rate (BER) vs. Loss Budget with a 10 dBm laser power per fiber for three coherent modulation schemes according to an exemplary embodiment of the disclosure.

FIG. 2 is a graphical depiction of several plots depicting Bit Error Rate (BER) vs. Loss Budget 110 with a 10 dBm laser power per fiber for three coherent modulation schemes 112, 114, 116 according to an exemplary embodiment of the disclosure. With reference to FIG. 2, the 4×400G ASK scheme 114 has the same modulation dependent loss and power sensitivity as the 400G 16QAM coherent modulation scheme 112, but saves 3 dB in-phase/quadrature (IQ) loss. In the embodiment shown in FIG. 2, the 4×400G QPSK coherent modulation scheme 116 shows a significant advantage of loss budget compared to the other two coherent modulation schemes 112, 114. The greater the loss budget the more loss the modulation scheme can tolerate over an optical fiber.

Figure 3:
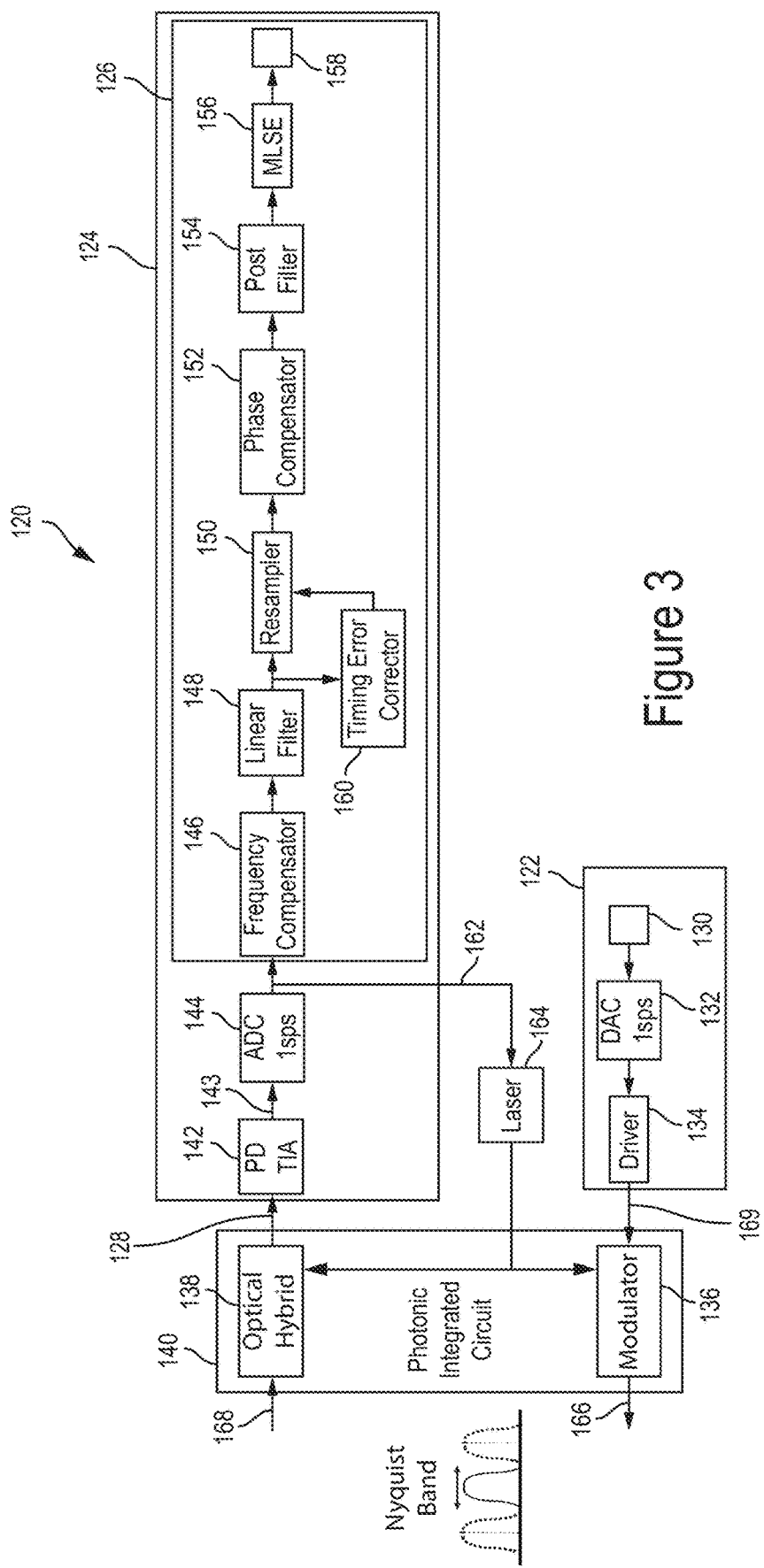
FIG. 3 is a block diagram of a symbol-rate coherent module for short-distance link according to an exemplary embodiment of the disclosure.

FIG. 3 is shown a block diagram of a coherent optical transceiver 120 for short-distance link according to an exemplary embodiment of the disclosure. With reference to FIG. 3, the coherent optical transceiver 120 comprises a photonic integrated circuit 140 (PIC) in communication with a transmitter 122 and a receiver 124. The PIC 140 includes a modulator 136 (e.g., an optical modulator) and an optical hybrid 138. The receiver 124 comprises a DSP 126. In one embodiment, the DSP 126 can be a symbol-rate sampling digital signal processor. In one embodiment, the coherent optical transceiver 120 is configured as a symbol-rate coherent module. In one embodiment, the coherent optical transceiver 120 is a low power coherent optical transceiver.

Turning now to the transmitter 122 portion of the coherent optical transceiver 120, the transmitter 122 generates an output analog electrical signal 169 based on the binary input data represented by the digital signal 130 and the PIC 140 converts the output analog electrical signal 169 to an output optical signal 166 corresponding to the output analog electrical signal 169. The PIC 140 receives an input optical signal 168 and converts the input optical signal 168 to an optical signal 128 corresponding to the input optical signal 168, over an optical communication channel, which serves as the input to the receiver 124. It desired that the signal spectrum of the input optical signal 168 match the output optical signal 166 and that both are within the Nyquist frequency zone.

Still with reference to the transmitter 122 portion of the coherent optical transceiver 120, the transmitter 122 comprises a digital-to-analog converter 132 (DAC) and a driver 134 coupled to the PIC 140. The DAC 132 is configured to convert digital data in the digital signal 130 to analog data by converting discrete digital values to discrete analog output values at a rate of one sample per symbol (1sps). In some implementations, the digital signal 130 may carry one or more data symbols, where each data symbol represents one or more bits of digital data. For example, the DAC 132 may convert each symbol into an analog voltage mapped to that particular symbol. In some aspects, the transmitter 122 may use a 4-level pulse-amplitude modulation (PAM-4) scheme to map the data symbols to four discrete voltage levels (e.g., where each voltage level represents two bits of digital data). For example, in one embodiment the DAC 132 converts two bits into four levels. The driver 134 connects the DAC 132 and the modulator 136. The driver 134 amplifies the output analog electrical signal 169 from the DAC 132 and sends it to the modulator 136. Accordingly, the voltage level(s) of the digital signal 130 may correspond to the data symbols representing the digital data. The output of the DAC 132 is an analog signal representative of the digital data. The output of the DAC 132 is coupled to the driver 134. For example, the driver 134 can be one of a class A, class AB, or class D driver. The driver 134 provides the output analog electrical signal 169 to the PIC 140 modulator 136. The output analog electrical signal 169 output of the driver 134 is coupled to the PIC 140.

Turning now to the PIC 140 portion of the coherent optical transceiver 120, the PIC 140 modulator 136 modulates the output analog electrical signal 169. To leverage the increased bandwidth afforded by an optical communication medium, the PIC 140 converts binary input data from the electrical domain to the optical domain. More specifically, the modulator 136 modulates the output analog electrical signal 169 to an output optical signal 166 corresponding to the output analog electrical signal 169. In one embodiment, the modulator 136 can be a Mach-Zehner modulator (MZM). A laser 164 also couples a laser signal into the PIC 140. The modulator 136 couples the laser signal to the optical hybrid 138 within the PIC 140. The optical hybrid 138 combines the optical signal from the modulator 136 with the laser input to generate a modulated output optical signal 166.

Turning now to the receiver 124 portion of the coherent optical transceiver 120, the receiver 124 receives an optical signal 128 from the PIC 140 transmitted over an optical communication medium or channel. The receiver 124 comprises a photodiode transimpedance amplifier 142 (PD-TIA), an analog-to-digital converter 144 (ADC), and a digital signal processor 126 (DSP). In one embodiment, the DSP 126 is a low power DSP. In one embodiment, the DSP 126 samples at a symbol-rate (e.g., symbols per second) and may be referred to herein as a symbol rate DSP. The PD-TIA 142 portion of the receiver 124 converts the optical signal 128 received from the PIC 140 to an input analog electrical signal 143 indicative of the optical signal. The photodiode portion of the PD-TIA 142 converts the optical power of the received optical signal 128 to an analog electrical current. The transimpedance amplifier portion of the PD-TIA 142 is configured to convert the electrical current to an input analog electrical signal 143. The input analog electrical signal 143 is converted to a digital signal by the ADC 144 using a sample rate of one sample per symbol (1sps). At this juncture, it is worthwhile noting that both the ADC 144 in the receiver 124 and the DAC 132 in the transmitter 122 have a sampling rate of one sample per symbol (1sps). Sampling at one sample per symbol lowers the power requirement of the DSP 126. The digital signal 162 from the ADC 144 is coupled to the DSP 126, where the DSP 126 processes the digital signal using digital signal processing techniques to recover binary data transmitted over the optical channel. The receiver 124 is configured to sample at a one sample per symbol rate instead of a multiple samples per symbol rate to give the DSP 126 less data to process, thus lowering the power consumption of the DSP 126.

In addition, the digital signal 162 at the output of the ADC 144 is fed back to the laser 164 for controlling the frequency of the laser 164. The frequency offset of the laser 164 can be measured from the signal spectrum, which is calculated from the ADC 144 data. Controlling the frequency of the laser 164 minimizes frequency offset of the modulated signal that can occur when the laser 164 is not synchronized with the frequency of the signal.

Turning now to the DSP 126 portion of the receiver 124, the DSP 126 comprises a frequency compensator 146, a linear filter 148 (which is also referred to herein as an adaptive linear equalizer), a resampler 150, a phase compensator 152 (e.g., carrier phase compensator), a post filter 154, and a MLSE 156. The MLSE 156 determines the symbol value and outputs an output signal 158, which is close or identical to the input symbol represented by the digital signal 130 into the transmitter 122 DAC 132.

The frequency compensator 146 is configured to receive the digital signal from the ADC 144. The frequency compensator 146 is placed directly after the ADC 144 sampling to recover the signal spectrum of the transmitted analog electrical signal. The received input analog electrical signal 143 is sampled by the ADC 114 at one sample per symbol (1sps). Aliasing can occur in the first Nyquist frequency zone after sampling the input analog electrical signal 143 at one sample per symbol (1sps) due to laser 164 frequency error. In some embodiments, the signal spectrum of the input analog electrical signal 143 may be moved outside the first Nyquist frequency zone into the second Nyquist frequency zone. The frequency compensator 146 uses digital frequency compensation to recover the signal spectrum as described herein below in connection with FIGS. 4A-4C.

Figure 4A:
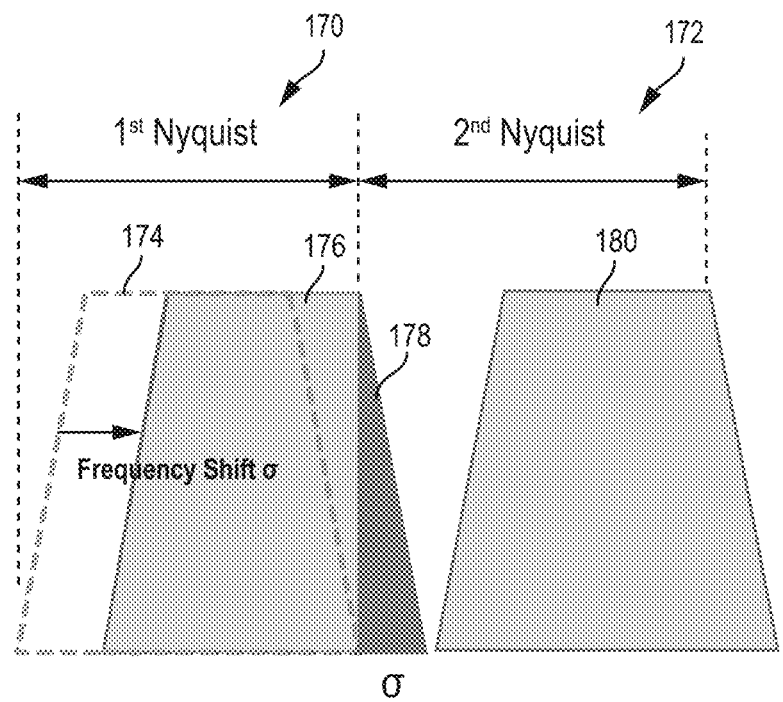
FIGS. 4A-4C illustrate embodiments of tolerating laser frequency offset with symbol-rate sampling according to an embodiment of the disclosure, where.
Figures 4B, 4C:
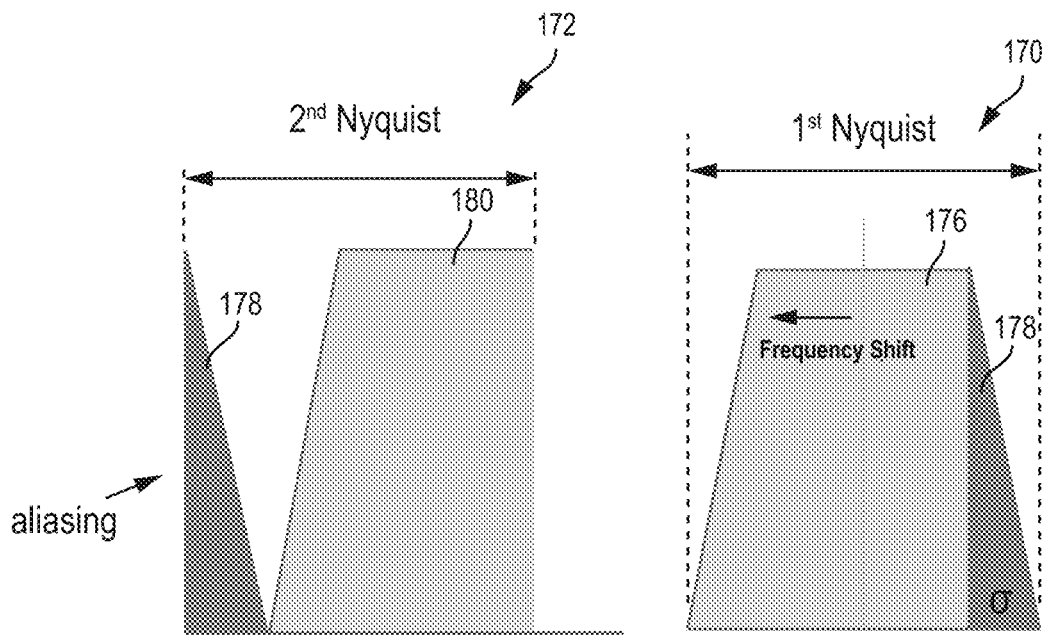

FIGS. 4A-4C illustrate embodiments of tolerating laser frequency offset with symbol-rate sampling according to an embodiment of the disclosure. In some embodiments, a received signal spectrum may shift outside the first Nyquist frequency zone due to a large laser frequency offset referred to a frequency shift (σ) of the laser. In some embodiments, the spectrum beyond the Nyquist frequency may be aliased back into the first Nyquist band after ADC sampling. FIGS. 4A-4C show the aliasing penalty due to the frequency shift (σ) of the laser that can be avoided when the transmit spectrum is confined within a first Nyquist frequency zone 170. With reference also to FIG. 3, in some embodiments, signal components 178 of the first signal spectrum 176 of the received optical signal 128 may shift outside the first Nyquist frequency zone 170 due to large laser frequency offset. In some embodiments, the signal spectrum 176 of the received input analog electrical signal 143 before ADC 144 sampling may be moved into the second Nyquist frequency zone 172 after sampling by the ADC 144. A DSP 126 sampling at the symbol-rate may recover a signal using the frequency compensator 146 when the transmit signal spectrum 174 of the transmitted optical signal 166 is contained within the first Nyquist frequency zone 170.

Referring now to FIG. 4A together with FIG. 3, FIG. 4A is a diagram depicting a transmit signal spectrum 174 shown in dashed line and a received signal spectrum of the input analog electrical signal 143 before analog-to-digital conversion by the ADC 144 that has moved outside the first Nyquist frequency zone 170 into a second Nyquist frequency zone 172 due to frequency shift (σ) attributed to the laser 164 according to an exemplary embodiment of the disclosure. The example embodiment of FIG. 4A shows a first signal spectrum 176 of the input analog electrical signal 143 received by the receiver 124 before digital sampling by the ADC 144. The signal spectrum 176 includes signal components 178 outside the first Nyquist frequency zone 170 due to laser frequency error, which is indicative of a frequency shift (σ). Accordingly, the first signal spectrum 176 is only partially located within the first Nyquist frequency zone 170 and signal components 178 extend into the second Nyquist frequency zone 172. As a result, the second signal spectrum 180 also is offset, with a portion of the second signal spectrum 180 extending past the second Nyquist frequency zone 172. The portion of the first signal spectrum 176 that extends past the first Nyquist frequency zone 170 is the aliasing signal component 178 when analog electrical signal is digitally sampled at one sample per symbol (1sps) by the ADC 144.

With reference now to FIG. 4B together with FIG. 3, FIG. 4B is a diagram depicting the aliasing signal component 178 of the signal spectrum 176 of the received input analog electrical signal 143 that extends into the second Nyquist frequency zone 172 due to aliasing caused by the ADC 144 downsampling to one sample per symbol (1sps) according to an exemplary embodiment of the disclosure. The example embodiment of FIG. 4B shows the signal spectrum after symbol-rate sampling by the ADC 144. After symbol-rate sampling, only the first Nyquist frequency zone 170 can be seen. The signal component 178 of the first signal spectrum 176 is outside first Nyquist frequency zone 170 and has moved into the second Nyquist frequency zone 172 as an aliasing signal component 178 caused by the ADC 144 downsampling to one sample per symbol (1sps).

FIG. 4C is a diagram depicting the recovered first signal spectrum 176 outside the first Nyquist frequency zone 170 using digital frequency compensation according to an exemplary embodiment of the disclosure. Referring now to FIG. 4C together with FIGS. 3, 4A, and 4B, the example embodiment of FIG. 4C shows that the first signal spectrum 176 can be recovered after digital frequency compensation by the frequency compensator 146. The first signal spectrum 176 is compensated by the frequency shift (σ) to include the aliasing signal component 178 in the first Nyquist frequency zone 170. The frequency shift (σ) is done for each signal spectrum that has aliasing components. Signal aliasing can be compensated without a penalty because the transmitted signal spectrum is within the first Nyquist frequency zone 170 such that the signal component 178 does not overlap with the second signal spectrum 180 in the second Nyquist frequency zone 172 after frequency offset.

With reference now back to the DSP 126 portion of the receiver 124 shown in FIG. 3, in various embodiments, the present disclosure provides techniques for avoiding dispersion penalties that can occur when using a DSP 126 sampling at the symbol-rate. In some embodiments, to avoid dispersion penalties, a transmit signal spectrum may need to be limited within the first Nyquist frequency zone. In many embodiments, if a transmit signal spectrum is wider than the first Nyquist frequency zone, the overlapped spectrum (e.g., aliasing) after digital sampling by the ADC 144 may have a different phase modulation due to chromatic dispersion, and may not be able to be recovered. Thus, on the transmitter 122 side, the modulator 136 is configured with a bandwidth that is less than the first Nyquist frequency zone. By maintaining the bandwidth within the first Nyquist frequency zone, aliasing penalty is less likely to occur by sampling at one sample per symbol (1sps).

With continued reference to FIG. 3, in various embodiments, the DSP 126 based receiver 124 equalizer and transmitter 122 modulator 136 driver 134 of the present disclosure are configured to process high baud rate signals. In various embodiments, the PIC 140 may be fabricated using silicon photonics (SiPh) that leverages CMOS fabrication technology and can enable high density optical integration to provide next generation optical transceivers for data communications. In certain embodiments, SiPh may rely on low efficiency plasma dispersion effects. Thus, in embodiment, a modulator 136 base on SiPh MZM, for example, may have lower electrical/RF bandwidth than a Nyquist frequency of 400G QPSK at a given voltage or modulator loss limit. In some embodiments, components of the transmitter 122 having a narrow bandwidth can automatically avoid a dispersion penalty. In other embodiments, performance of the receiver 124 can be degraded due to enhanced digital noise generated by an equalizer and increase modulation dependent losses.

With continued reference to FIG. 3, in various embodiments, to improve modulation dependent losses and improve sensitivity performance of the receiver 124, an adaptive linear equalizer and transmit analog transfer function may enable high baud rate communications using SiPh modulators. After the frequency compensator 146, the DSP 126 includes a linear filter 148 to compensate for chromatic dispersion and analog transfer function. In the example embodiment shown FIG. 3, because the signal spectrum is within the Nyquist frequency zone, it is possible to use a resampler 150, thus, it is not necessary to control the ADC 144 sampling time.

The linear filter 148 receives the digital frequency compensated recovered signal from the frequency compensator 146. The linear filter 148 is configured to equalize intersymbol interference (ISI) and thus may be referred to herein as an adaptive linear equalizer. The linear filter 148, however, also increases the amount of noise introduced into the signal. In certain embodiments, the linear filter 148 (e.g., equalizer) may be configured to compensate a channel transfer function by using a constant module algorithm (CMA) or a least mean square (LMS) algorithm. In some embodiments, a channel transfer function may be separated as a product of an all-pass filter with phase response only and magnitude transfer function given by the expression:

$$H_{ch}(z)=H_{ch,m}(z)H_{ch,ap}(z) \quad (1)$$

where $H_{ch}(z)$ is the frequency transfer function of the channel, $H_{ch,m}(z)$ is the magnitude transfer function of the channel, and $H_{ch,ap}(z)$ is the all-pass filter with phase response transfer function of the channel.

Accordingly, in various embodiments, the linear filter 148 may be configured to approximate the inverse of the channel transfer function $H_{ch}(z)$ given by the expression:

$$H_{ch}^{-1}(z)=H_{ch,ap}(z^{-1})/H_{ch,m}(z) \quad (2)$$

where $H_{ch}^{-1}(z)$ is the inverse channel transfer function implemented by the linear filter 148 (e.g., equalizer), $1/H_{ch,m}(z)$ is the inverse of the magnitude transfer function of the channel, and $H_{ch,ap}(z^{-1})$ is the inverse of the all-pass filter with phase response transfer function of the channel, as described in more detail hereinbelow in connection with FIG. 5.

With continued reference to FIG. 3, in certain embodiments, where the modulator 136 and the driver 134 bandwidths are smaller than the Nyquist frequency, the symbol-rate linear equalizer, e.g., the linear filter 148, may have a pre-emphasis at high frequency and may generate enhanced digital noise as described hereinbelow in connection with FIG. 5. With reference back to FIG. 3, as a result, in some embodiments, the receiver 124 with only the linear filter 148 equalizer may exhibit poor performance. In certain embodiments, to suppress the enhanced digital noise added by the linear filter 148, the post filter 154 can be implemented as a simple first order finite impulse response (FIR) filter with a frequency transfer function given by the expression:

$$G(z)=1+az-1, \text{ where } 0<a<1 \quad (3)$$

is provided in the receiver 124. An example of the post filter 154 transfer function $G(z)=1+az^{-1}$ is shown in the example embodiment described in connection with FIG. 6.

Figure 5:
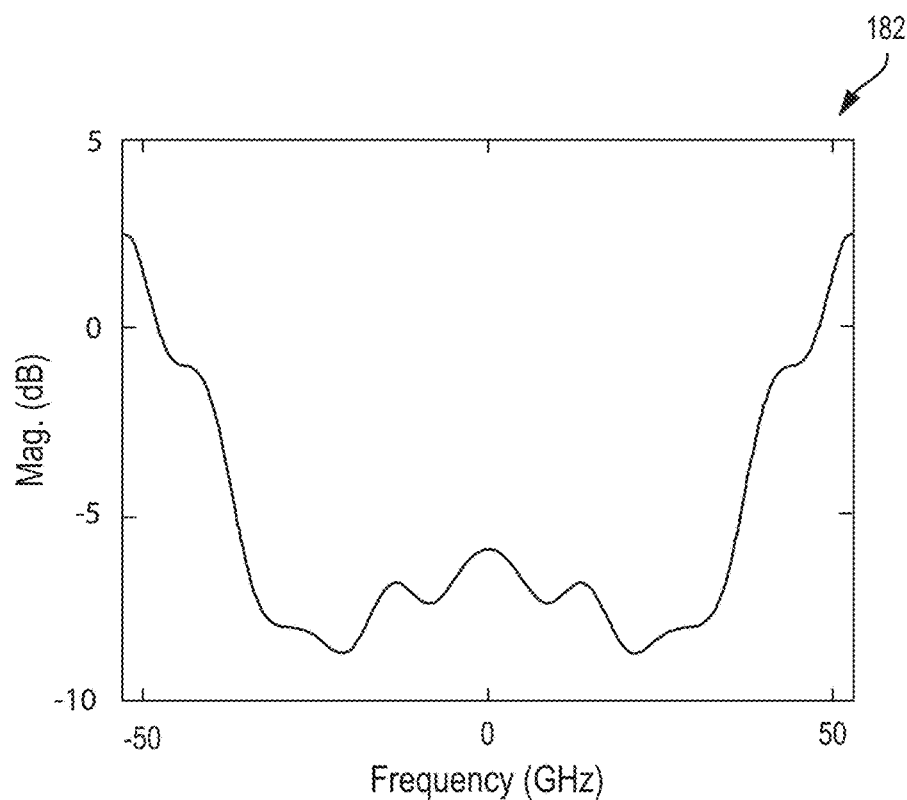
FIG. 5 illustrates a frequency transfer function of a linear filter equalizer at a symbol rate of 106G baud according to an exemplary embodiment of the disclosure.

Turning first to FIG. 5, the embodiment depicted therein illustrates a frequency transfer function 182 of a linear filter equalizer at a symbol rate of 106G baud according to an exemplary embodiment of the disclosure. With reference now to the example embodiment of FIG. 5 together with FIG. 3, the frequency transfer function 182 is the result of the process of filtering both the signal and the noise in the receiver 124 before the signal enters the MLSE 156. This can be equivalently expressed in a simplified form as shown in the example embodiment of FIG. 6.

Figure 6:
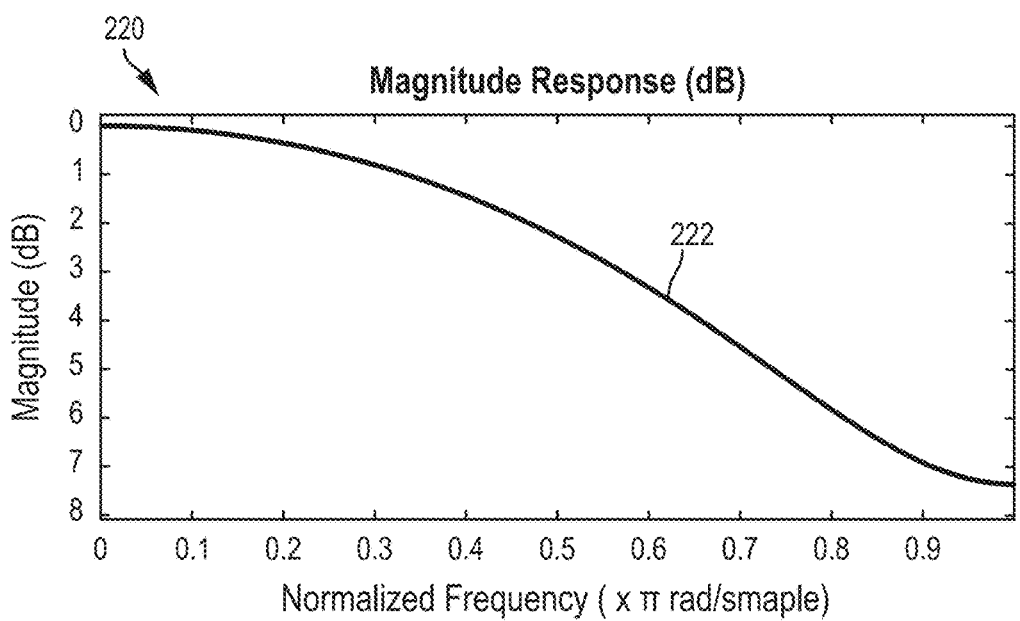
FIG. 6 illustrates a frequency transfer function of a post filter located in front of a MLSE according to an exemplary embodiment of the disclosure.

FIG. 6 illustrates a frequency transfer function 220 of a post filter located in front of a MLSE according to an exemplary embodiment of the disclosure. With reference now to the example embodiment of FIG. 5 together with FIG. 3, the frequency transfer function 220 depicts a magnitude response 222 of the post filter 154 positioned in front of the MLSE 156, where the frequency transfer function 220 is given by the expression:

$$G(z)=1+0.6*z^{-1} \quad (4)$$

In most embodiments, as the linear filter 148 (e.g., adaptive equalizer) approximates the inverse channel function, $H_{ch,ap}(z^{-1})/H_{ch,m}(z)$, a signal channel in the MLSE 156 may be fixed as $G(z)=1+az-1$ independent of the actual channel transfer function. The example embodiment of FIG. 6 shows the Trellis of the in-phase component of a QPSK modulation scheme. In the example embodiment of FIG. 6, the Trellis has two states and four metric branches per Trellis segment. In many embodiments, the metric branches may be $2^{(L+1)}$, where L may be the filter orders of G(z). The Trellis is described in more detail hereinbelow with reference to FIG. 9C.

With reference now back to FIG. 3, in various embodiments, the receiver 124, and more particularly the DSP 126 portion of the receiver 124, provides clock recovery with symbol-rate sampling. The output of the linear filter 148 splits and is coupled to both a timing error corrector 160 and the resampler 150. The resampler 150 re-samples the filtered signal after the timing correction has been done by the timing error corrector 160 on the filtered signal.

Figure 7:
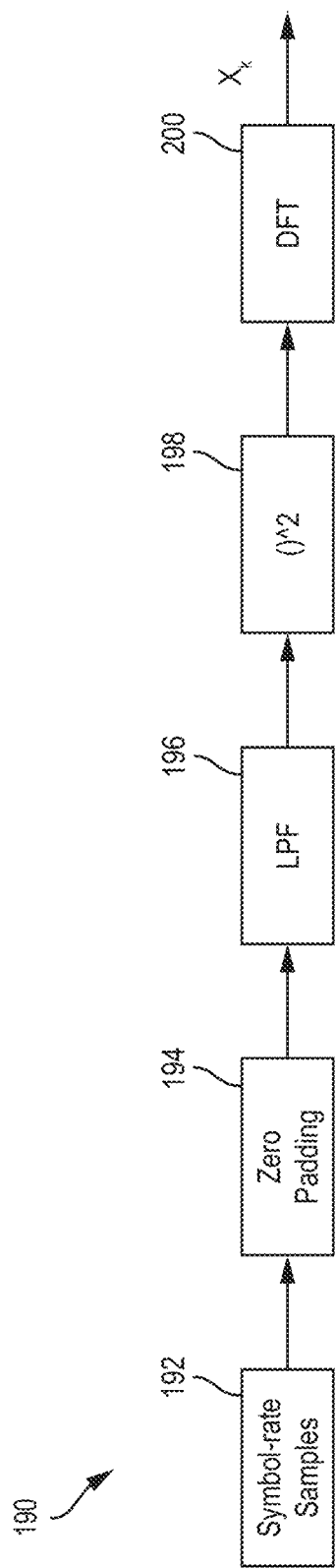
FIG. 7 illustrates a clock recovery process according to an exemplary embodiment of the disclosure.

FIG. 7 illustrates a clock recovery process 190 according to an exemplary embodiment of the disclosure. With reference now to the embodiment of FIG. 7 together with FIG. 3, the clock recovery process 190 includes receiving the symbol-rate samples 192 at the timing error corrector 160 shown in FIG. 3. The timing error corrector 160 pads 194 the signal with zeroes and couples that signal to a low pass filter 196. The filtered signal is squared 198 and the timing error corrector 160 performs a discrete Fourier transform 200 on the squared signal. The result is used in the timing error estimation equation as indicated by the expression:

$$\varepsilon = \frac{1}{2\pi}\arg\left(\left|\sum_{k=0}^{N-1} X_k X^*_{k-\frac{N}{2}}\right|\right) \quad (5)$$

Figure 8:
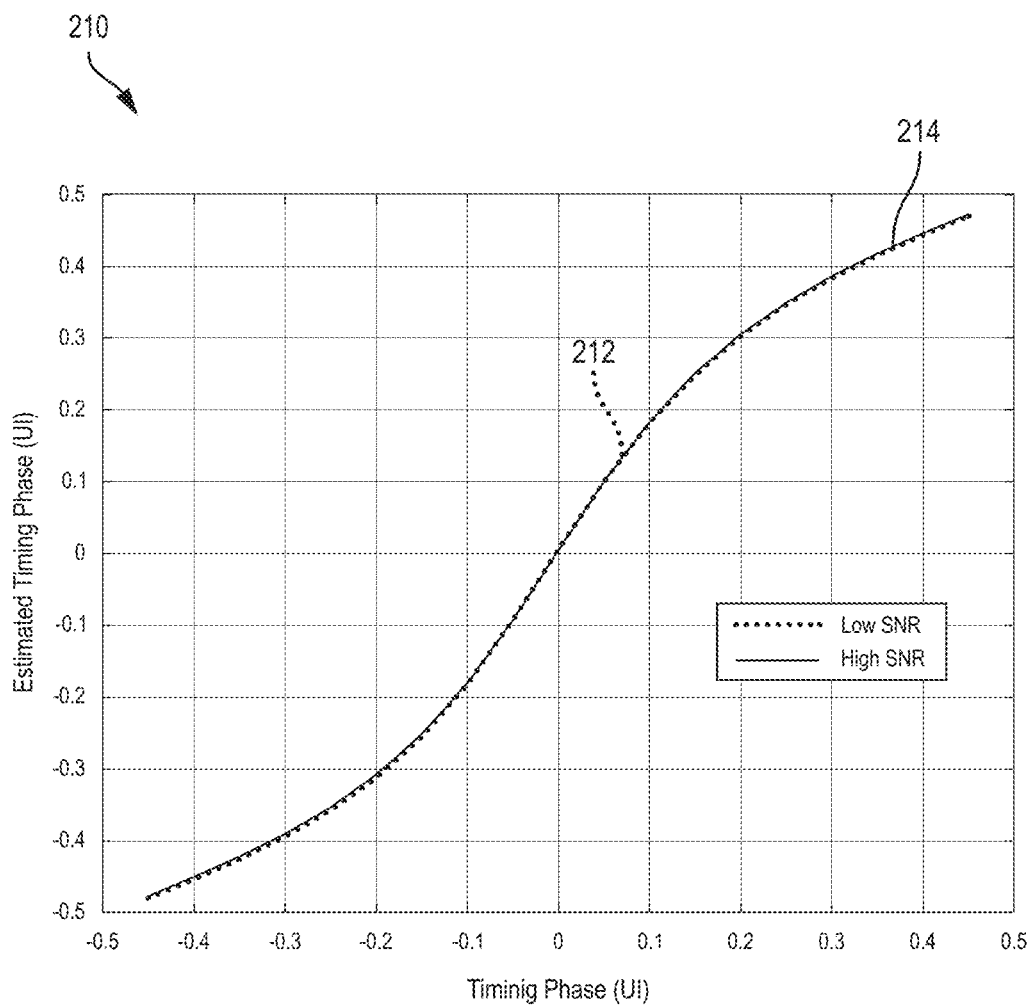
FIG. 8 is a graphical illustration of a timing error estimation for a symbol-rate receiver digital signal processor according to an exemplary embodiment of the disclosure.

FIG. 8 is a graphical illustration of a timing error estimation 210 for a symbol-rate receiver digital signal processor according to an exemplary embodiment of the disclosure. The timing error estimation 210 shows the difference between a low signal to noise ratio 212 (SNR) and a high SNR 214 in the DSP 126.

With continued reference to FIG. 3, after the resampler 150, the signal is coupled to the phase compensator 152. The signal from the phase compensator 152 is coupled to the post filter 154. As discussed above, the post filter 154 is a first order finite impulse response (FIR) filter with a first order frequency transfer function given by $G(z)=1+az^{-1}$, where a is between 0 and 1, to suppress enhanced digital noise that may have been introduced by the linear filter 148. The post filter 154 introduces ISI that is known and controllable. For example, since the ISI introduced by post filter 154 is known, the DSP 126 can compensate for the added noise. The noise introduced is then compensated by the MLSE 156.

FIGS. 9A-C illustrate a process of filtering a signal s(t) and noise n(t) before entering the MLSE 156 according to an exemplary embodiment of the disclosure. FIG. 9A illustrates a model 230 of a signal s(t) and noise n(t) in the DSP 126 before entering the MLSE 156 according to an exemplary embodiment of the disclosure. With reference now to both FIG. 9A and FIG. 3, the optical signal 128 from the PIC 140 enters the channel 129 into the receiver 124. The receiver 124 converts the optical signal 128 to a signal s(t). The signal (s(t)) enters the channel 129, which is characterized by the channel transfer function given by the expression $H_{ch}(z)=H_{ch,m}(z)H_{ch,ap}(Z)$ (1). The white noise 232 n(t) is introduced into the receiver 124 between the channel 129 and the linear filter 148 (e.g., equalizer). The linear filter 148 may be characterized by the transfer function expression $H_{ch}^{-1}(z)=H_{ch,ap}(z^{-1})/H_{ch,m}(z)$ (2). The output of the linear filter 148 is provided to the post filter 154 characterized by the transfer function G(z). The output of the post filter 154 is coupled to the MLSE 156. The post filter 154 is configured to remove the white noise 232 before the signal is analyzed by the MLSE 156. In many embodiments, a mismatch of noise statistics may affect the performance of the MLSE 156.

In some embodiments, noise entering the MLSE 156 may not be white noise, but may have a spectrum given by the expression:

$$H_{noise,ch}(Z)H^*_{noise,ch}(1/z^*) \quad (6)$$

In certain embodiments, white noise with a spectrum may violate a white noise assumption of the MLSE 156 since the MLSE 156 selects a sequence s that may minimize a Euclidean distance metric between the received signal sequence r and s given by the expression:

$$D(r, s) = \sum_{k=1}^{K} (r_k - s_k)^2 \quad (7)$$

In many embodiments, a mismatch of noise statistics may affect the performance of the MLSE 156. FIG. 9B illustrates a process 240 for filtering a signal s(t) and the noise n(t) to optimize the performance of the MLSE 156 according to an exemplary embodiment of the disclosure. In various embodiments, to optimize the performance of the MLSE 156, the driver 134 and the modulator 136 should be configured such that:

$$H_{ch,m}(Z)=G(z) \quad (8)$$

As shown in FIG. 9B, the signal channel transfer function is given by the following expression:

$$H_{signal,ch}(Z)=G(z) \quad (9)$$

The white noise 232 n(t) is injected into a noise channel 234 characterized by a noise channel transfer function given by the following expression. This noise into MLSE is white noise only when $H_{ch,m}(z)=G(z)$.

$$H_{noise,ch}(z)=H_{ch,ap}(z^{-1})G(z)/H_{ch,m}(z) \quad (10)$$

FIG. 9C is a diagram of a Trellis segment 250 corresponding to the filtering process of signal s(t) and noise n(t) into the MLSE 156 as shown in FIG. 9B according to an exemplary embodiment of the disclosure. The MLSE 156 performs the analysis according to the Trellis segment 250. In the example embodiment of FIG. 9C, the Trellis segment 250 has 2 states and 4 metric branches 252, 254, 256, 258 per segment. In many embodiments, the metric branches 252, 254, 256, 258 may be $2^{(L+1)}$, where L may be the filter orders of G(z). In order to keep the analysis simple at the MLSE 156, L can be set to a low value. Ideally L is equal to one (L=1), which results in a first order filter as the second filter.

Figure 10:
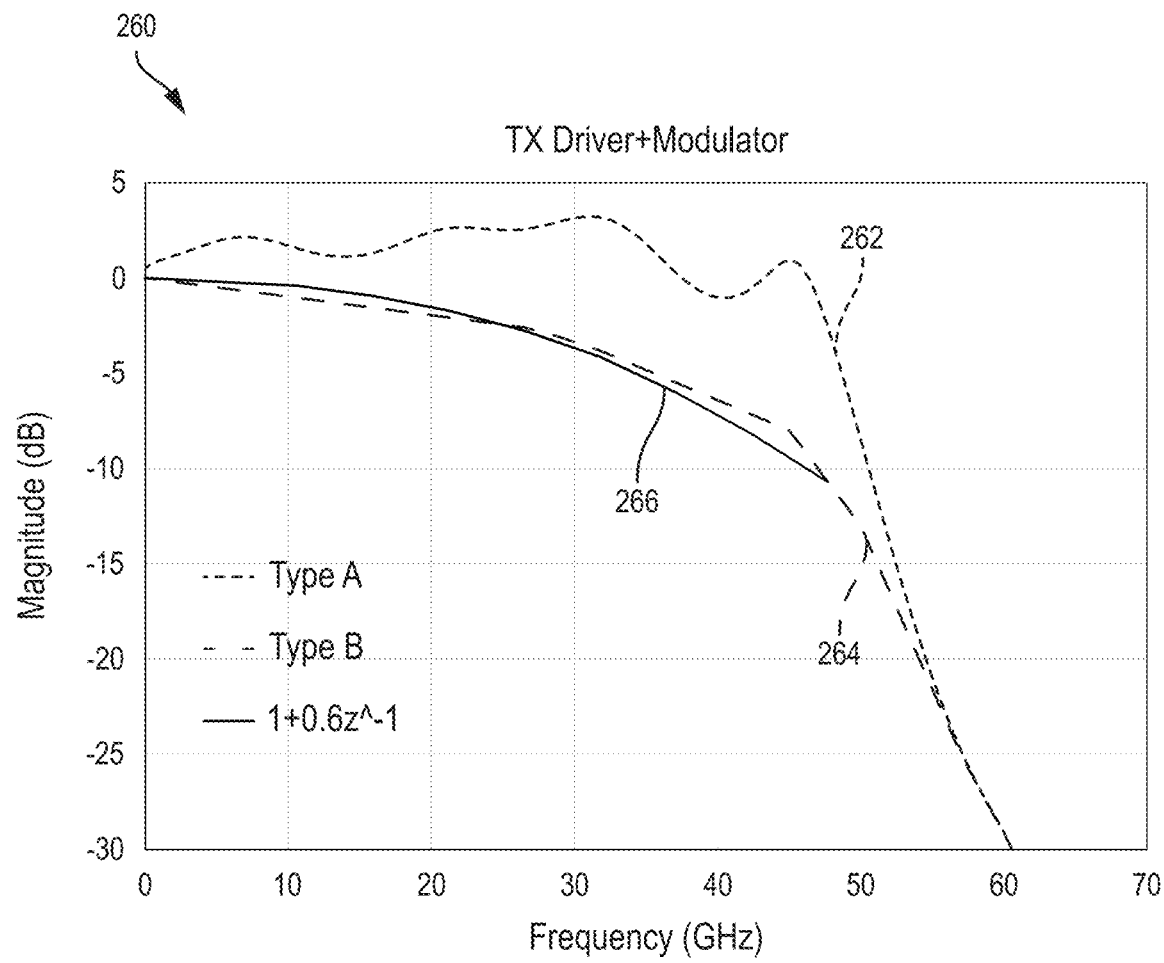
FIG. 10 illustrates transfer functions of a transmitter driver and modulator for 400G QPSK, which has a baud rate of 106G baud according to an exemplary embodiment of the disclosure.

FIG. 10 illustrates transfer functions 260 of a transmitter driver and modulator for 400G QPSK, which has a baud rate of 106G baud according to an exemplary embodiment of the disclosure. With reference now to the example embodiment of FIG. 10 together with Table 3, a transfer function 262 for a Type A transmitter driver/modulator has a wider BW than a transfer function 264 for a Type B transmitter driver/modulator and Type A driver/modulator is more difficult to design. In the example embodiment of FIG. 10, a Type B driver/modulator has a smaller modulation dependent loss and better power sensitivity (6.89 dB, −21.1 dBm) compared to the Type A driver/modulator (8.45 dB, −20.5 dBm) as shown below in Table 3. In the example embodiment of FIG. 10, this is because the Type B driver/modulator is close to the post filter 154 used in the MLSE 156 as shown in FIG. 3, which is modeled by the desired transfer function 266.

TABLE 3

|  | Type A | Type B |
|---|---|---|
| Modulation dependent loss (dB) | 8.45 | 6.89 |
| Tx power (dBm) | −13 | −12.35 |
| Power sensitivity (dBm) @ 2e−4 | −20.5 | −21.1 |
| Loss Budget (dB) | 7.5 | 8.75 |

In view of the foregoing description with reference to FIG. 3, the present disclosure provides a coherent optical transceiver 120 for communication distances of short distance ranging from about 500 to 2000 meters. The coherent optical transceiver 120 has a DSP 126, low power analog circuits, a transmitter 122, and a receiver 124. The receiver 124 uses an MLSE 156 with a post filter 154 implemented as a first-order channel filter with a transfer function of $G(z)=1+az^{-1}$ (0<a<1). The transmitter 122 transfer function is designed as a post filter. The post filter is a linear filter and occurs after carrier phase recovery (CPR) (e.g., phase compensator 152) and an adaptive linear equalizer (e.g., linear filter 148).

The DSP 126 of the coherent optical transceiver 120 employs a DAC 132 and an ADC 144 each with a conversion rate of one sample per symbol (1sps).

The DSP 126 of the coherent optical transceiver 120 is configured to estimate timing error (e.g., timing error corrector 160) based on received one sample per symbol (1sps) data and resamples (e.g., resampler 150) a waveform digitally without employing an analog phase lock loop (PLL) control of the ADC 144.

In the coherent optical transceiver 120, to enable a resampler 150 in the DSP 126, the transmit signal spectrum is within a first Nyquist-band. The driver 134 and the modulator 136 bandwidth are reduced to minimize the power consumption of the analog circuits.

In the coherent optical transceiver 120, the transfer function of the modulator 136 and the driver 134 are optimized as a first-order filter $1+az^{-1}$. The modulation dependent loss (MDL) is reduced as a filter length is short. The optimization improves the loss budget for short-distance communication.

The coherent optical transceiver 120 comprises a frequency compensator 146 after the ADC 144 and before further data processing. The frequency compensator 146 compensates the frequency error and recovers aliasing due to a large frequency offset of the laser 164 when a transmit spectrum is within the Nyquist band.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within +2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC § 112(f). Absent a recital of "means for" in the claims, such claims should not be construed under 35 USC § 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

The invention claimed is:

1. A coherent optical transceiver for optical communication, coherent optical transceiver comprising:
    a transmitter comprising:
        a digital-to-analog converter (DAC) configured to convert an output digital electrical signal to an output analog electrical signal at a DAC sampling rate;
        a driver coupled to the DAC;
        a photonic integrated circuit (PIC) coupled to the driver, wherein the PIC is configured to convert the output analog electrical signal to an output optical signal, the PIC comprising:
            a modulator configured to modulate the output analog electrical signal with a laser beam to generate the output optical signal, wherein the modulator is configured to limit a signal spectrum of the output optical signal within a Nyquist frequency band and a receiver comprising:
  an input circuit configured to receive an input optical signal from the PIC and convert the input optical signal to an input analog electrical signal;
  an analog-to-digital converter (ADC) configured to convert the input analog electrical signal into a digital electrical signal indicative of the input optical signal at an ADC sampling rate; and
  a digital signal processor (DSP) comprising:
    a linear filter configured to equalize intersymbol interference;
    a post filter coupled to the linear filter, wherein the driver and the post filter are configured as a first order filter with a transfer function given by $G(z)=1+az^{-1}$, where a is between 0 and 1; and
    a maximum likelihood sequence estimator (MLSE) to determine symbols corresponding the input optical signal.

2. The coherent optical transceiver of claim 1, wherein a driver bandwidth of the driver and a modulator bandwidth of the modulator are selected to be less than the Nyquist frequency band.

3. The coherent optical transceiver of claim 1, wherein the modulator is characterized by a transfer function selected to be equal to the transfer function of the driver and is given by $H(z)=G(z)=1+az^{-1}$.

4. The coherent optical transceiver of claim 3, wherein the transfer function of the modulator and the transfer function of the driver are configured to reduce modulation dependent loss (MDL) and improves a loss budget for short-distance communications between 500 meters and 2 kilometers.

5. The coherent optical transceiver of claim 1, wherein the MLSE is configured to implement a trellis having a number of branches corresponding to $2(L+1)$, where L is a filter of same order as a transfer function $G(z)$ of the post filter.

6. The coherent optical transceiver of claim 1, wherein the DAC sampling rate is one sample per symbol (1sps) and the ADC sampling rate is one sample per symbol (1sps).

7. The coherent optical transceiver of claim 1, wherein the DSP comprises a digital frequency compensator coupled to an input of the linear filter.

8. The coherent optical transceiver of claim 7, wherein the digital frequency compensator is located after the ADC and before data processing circuits of the DSP, wherein the digital frequency compensator is configured to compensate for frequency offset based on a received spectrum of the input analog electrical signal, and wherein there is no penalty for aliasing due to the frequency offset when a transmit spectrum of a corresponding transmitted signal is within the Nyquist frequency band.

9. The coherent optical transceiver of claim 1, wherein the DSP comprises:
  a timing error corrector coupled to an output of the linear filter, wherein the timing error corrector is configured to estimate timing errors based on the ADC sampling rate of one sample per symbol (1sps); and
  a resampler coupled to the output of the linear filter and coupled to the output of the timing error corrector, wherein the resampler is configured to resample a waveform digitally.

10. The coherent optical transceiver of claim 9, wherein a signal spectrum of the resampler is within the Nyquist frequency band.

11. A transmitter of a coherent optical transceiver for optical communication, the transmitter comprising:
  a digital-to-analog converter (DAC) configured to convert an output digital electrical signal to an output analog electrical signal at a DAC sampling rate;
  a driver coupled to the DAC, wherein a driver transfer function of the driver is given by $H(z)=G(z)=1+az^{-1}$, where a is between 0 and 1, and wherein $G(z)$ is a transfer function of a post filter in a receiver of the coherent optical transceiver;
  a photonic integrated circuit (PIC) coupled to the driver, wherein the PIC is configured to convert the output analog electrical signal to an output optical signal, the PIC comprising:
    a modulator configured to modulate the output analog electrical signal with a laser beam to generate the output optical signal, wherein the modulator is configured to limit a signal spectrum of the output optical signal within a Nyquist frequency band, wherein the Nyquist frequency band is half the DAC sampling rate.

12. The transmitter of claim 11, wherein a driver bandwidth of the driver and a modulator bandwidth of the modulator are selected to be less than the Nyquist frequency band.

13. The transmitter of claim 11, wherein a transfer function of the modulator is selected to be equal to the transfer function of the driver and is given by $H(z)=G(z)=1+az^{-1}$.

14. The transmitter of claim 11, wherein the DAC sampling rate is one sample per symbol (1sps).

15. A receiver of a coherent optical transceiver for optical communication, the receiver comprising:
  an input circuit configured to receive an input optical signal from a photonic integrated circuit (PIC) and convert the input optical signal to an input analog electrical signal;
  an analog-to-digital converter (ADC) configured to convert the input analog electrical signal into a digital electrical signal indicative of the input optical signal at an ADC sampling rate; and
  a digital signal processor (DSP) comprising:
    a linear filter configured to equalize intersymbol interference;
    a post filter coupled to the linear filter, wherein the post filter is configured as a first order filter with a transfer function given by $G(z)=1+az^{-1}$, where a is between 0 and 1; and
    a maximum likelihood sequence estimator (MLSE) to determine symbols corresponding the input optical signal.

16. The receiver of claim 15, wherein the ADC sampling rate is one sample per symbol (1sps).

17. The receiver of claim 15, wherein the DSP comprises a digital frequency compensator coupled to an input of the linear filter.

18. The receiver of claim 17, wherein the digital frequency compensator is located after the ADC and before data processing circuits of the DSP, wherein the digital frequency compensator is configured to compensate for frequency offset based on a received spectrum of the input analog electrical signal, and wherein there is no penalty for aliasing due to the frequency offset when a transmit spectrum of a corresponding transmitted signal is within a Nyquist frequency band.

19. The receiver of claim 15, wherein the DSP comprises:
  a timing error corrector coupled to an output of the linear filter, wherein the timing error corrector is configured to estimate timing errors based on data sampled by the ADC at a sampling rate of one sample per symbol (1sps); and a resampler coupled to the output of the linear filter and coupled to the output of the timing error corrector, wherein the resampler is configured to resample a waveform digitally.

20. The receiver of claim 19, wherein a signal spectrum of the resampler is within a Nyquist frequency band.

* * * * *